(12) United States Patent
Gasore

(10) Patent No.: US 11,379,910 B2
(45) Date of Patent: Jul. 5, 2022

(54) SYSTEM AND METHODS FOR CONTROLLING PROCUREMENT PROCESS

(71) Applicant: Anicet Gasore, Laval (CA)

(72) Inventor: Anicet Gasore, Laval (CA)

(73) Assignee: ANICET GASORE, Laval (CA)

( * ) Notice: Subject to any disclaimer, the term of this patent is extended or adjusted under 35 U.S.C. 154(b) by 330 days.

(21) Appl. No.: 16/497,273

(22) PCT Filed: Mar. 23, 2018

(86) PCT No.: PCT/IB2018/051999
§ 371 (c)(1),
(2) Date: Sep. 24, 2019

(87) PCT Pub. No.: WO2018/172999
PCT Pub. Date: Sep. 27, 2018

(65) Prior Publication Data
US 2020/0342509 A1    Oct. 29, 2020

(30) Foreign Application Priority Data

Mar. 24, 2017 (CA) .................................. CA 2961903

(51) Int. Cl.
G06Q 30/06    (2012.01)
G06Q 30/08    (2012.01)
(Continued)

(52) U.S. Cl.
CPC ........... *G06Q 30/08* (2013.01); *G06F 16/958* (2019.01); *G06F 21/602* (2013.01);
(Continued)

(58) Field of Classification Search
CPC .............. G06Q 30/0611; G06Q 30/08; G06Q 30/0485; G06Q 30/0282; G06Q 30/0619;
(Continued)

(56) References Cited

U.S. PATENT DOCUMENTS 7,401,034 B1 * 7/2008 Srivastava ............. G06Q 40/04
705/26.3
2007/0016514 A1 * 1/2007 Al-Abdulqader ..........................
G06Q 10/06311
705/37

(Continued)

FOREIGN PATENT DOCUMENTS

WO   WO-03107146 A2 * 12/2003  ........... G06F 16/986
WO   WO-2015131103 A1 *  9/2015  ............. G06Q 10/10

OTHER PUBLICATIONS

Carrol, Mary Rita, " The Effect of Uncertainty Based in Field Characteristics of the Proposer and Reviewer on Criteria Used in Decision Making About the Award of Internal Research Grants", published in 1980 in ProQuest Dissertations retrieved from Dialog on Apr. 5, 2022.*

*Primary Examiner* — Yogesh C Garg
(74) *Attorney, Agent, or Firm* — Brouillette Legal Inc.; Robert Brouillette

(57) ABSTRACT

A method and system for controlling procurement systems where tender review process is by selecting external/internal reviewers randomly and by managing at least three levels of reviews. The method comprises collecting a tender information by an application server; collecting the bids; and collecting reviews at each level and transmitting the reviews to the next-level reviewers. The reviewers are selected from a reviewer register for each review level. The first-level reviews are transmitted or kept confidential as per entity preference to the second-level reviewer devices and the second-level reviews are collected within a limit period of time and simultaneously. The second-level reviews are collected from the second-level reviewers and transmitted to the third-level reviewers. The system may analyse the collected reviews and select the winner of the tender based on reviews collected. By option, the system can also hide (Continued)

bidders' information such names at a certain level of analysis/analysts depending on the materiality and available resources.

20 Claims, 7 Drawing Sheets

(51) Int. Cl.
*G06F 16/958* (2019.01)
*G06F 21/60* (2013.01)
*G06Q 30/00* (2012.01)
*G06Q 30/02* (2012.01)
*G06Q 10/10* (2012.01)

(52) U.S. Cl.
CPC ..... *G06Q 30/0185* (2013.01); *G06Q 30/0282* (2013.01); *G06Q 30/0611* (2013.01); *G06Q 30/0619* (2013.01); *G06Q 10/103* (2013.01); *G06Q 2220/00* (2013.01)

(58) Field of Classification Search
CPC .............. G06Q 10/103; G06Q 2220/00; G06F 21/602; G06F 16/958
USPC ..................................................... 705/26.3
See application file for complete search history.

(56) References Cited

U.S. PATENT DOCUMENTS

| | | | |
|---|---|---|---|
| 2009/0240772 A1* | 9/2009 | Megiddo | G06Q 10/10 709/205 |
| 2011/0029351 A1* | 2/2011 | Intemann | G06Q 50/26 705/7.37 |
| 2014/0006201 A1* | 1/2014 | Judd | G06Q 30/08 705/26.3 |
| 2015/0242629 A1* | 8/2015 | Lindo | G06F 21/6236 726/1 |
| 2016/0110789 A1* | 4/2016 | Gilb | G06Q 30/0282 705/26.44 |

* cited by examiner

| No | Document | Administrative section | | | |
|---|---|---|---|---|---|
| | | Upload | 1st review | 2nd review | 3rd review |
| 1 | Company registration certificate | | Pass/Fail/Re-upload | Pass/Fail/Re-upload | Pass/Fail/Re-upload |
| 2 | Company audit report for last 3 years | | Pass/Fail/Re-upload | Pass/Fail/Re-upload | Pass/Fail/Re-upload |
| 3 | Guaranty of application | | Pass/Fail/Re-upload | Pass/Fail/Re-upload | Pass/Fail/Re-upload |
| 4 | Proof of financial abilities | | Pass/Fail/Re-upload | Pass/Fail/Re-upload | Pass/Fail/Re-upload |
| 5 | CVs of key personnel | | Pass/Fail/Re-upload | Pass/Fail/Re-upload | Pass/Fail/Re-upload |

| No | Items | Item description | Photo | Same/Alternative Tick as appropriate | Alternative items | Photo | Quantity |
|---|---|---|---|---|---|---|---|
| 1 | Laptop | Attachment | View | Same | N/A | N/A | 20 |
| 2 | Office desk | Attachment | View | Same/Alternative | | | 8 |
| 3 | Vehicle pick-up | Attachment | View | Same/Alternative | | | 3 |
| 4 | Printer | Attachment | View | Same | N/A | N/A | 5 |
| 5 | Chairs cat. 1 | Attachment | View | Same/Alternative | | | 1 |
| 6 | Chairs cat. 2 | Attachment | View | Same/Alternative | | | 2 |
| 7 | Chairs cat. 3 | Attachment | View | Same/Alternative | | | 5 |

Technical section of tender

| No | Items | Item description | Photo | Same/Alternative Tick as appropriate | Quantity |
|---|---|---|---|---|---|
| 1 | Laptop | Attachment | View | Same | 20 |
| 2 | Office desk | Attachment | View | Same/Alternative 8 | |
| 3 | Vehicle pick-up | Attachment | View | Same/Alternative 3 | |
| 4 | Printer | Attachment | View | Same | 5 |
| 5 | Chairs cat. 1 | Attachment | View | Same/Alternative 1 | |
| 6 | Chairs cat. 2 | Attachment | View | Same/Alternative 2 | |
| 7 | Chairs cat. 3 | Attachment | View | Same/Alternative 5 | |

Technical section of tender

Figure 4b

| Financial section (Price are all applicable tax inclusive) | | | | | | |
|---|---|---|---|---|---|---|
| No | Items | Item description | Photo | Supply option | Quantity | Unit price | Total price |
| 1 | Laptop | Attachment | View | Same | 20 | | |
| 2 | Office desk | Attachment | View | Alternative | 8 | | |
| 3 | Vehicle pick-up | Attachment | View | Alternative | 3 | | |
| 4 | Printer | Attachment | View | Same | 5 | | |
| 5 | Chairs cat. 1 | Attachment | View | Same | 1 | | |
| 6 | Chairs cat. 2 | Attachment | View | Same | 2 | | |
| 7 | Chairs cat. 3 | Attachment | View | Alternative | 5 | | |

| Bidder information | |
|---|---|
| Name | |
| Address | |
| Email | |
| Phone | |
| Fax | |
| Field tick as appropriate | |
| Experience time | |
| Head office country | |
| Legal status | |
| Business license date | |
| Business license number | |

Figure 6c

| First user sign up | |
|---|---|
| User name | |
| Email | |

Figure 6a

| Sign in | |
|---|---|
| User name | |
| Password | |

| Reviewer set up | |
|---|---|
| Requirement | Identification |
| Names | |
| Position | |
| End of contract date | |
| Company | |
| Phone address | |
| Email address | |
| Location address | |
| Expertise field 1 | |
| Expertise field 2 | |
| Expertise field 3 | |
| Expertise field 4 | |
| Expertise field 5 | |
| Level 1 | Yes/NO |
| Level 2 | Yes/NO |
| Level 3 | Yes/NO |
| Appeal/claims level 1 | Yes/NO |
| Appeal/claims level 2 | Yes/NO |
| Oversight | Yes/NO |

700

SYSTEM AND METHODS FOR CONTROLLING PROCUREMENT PROCESS

CROSS-REFERENCE TO RELATED APPLICATIONS

The present patent application claims the benefits of priority of Canadian Patent Application No. 2,961,903, entitled "SYSTEM AND METHODS FOR CONTROLLING TENDER REVIEW PROCESS" and filed at the Canadian Intellectual Property Office on Mar. 24, 2017, the content of which is incorporated herein by reference.

FIELD OF THE INVENTION

The present invention generally relates to managing tenders and procurement process. More particularly, the present invention relates to systems and methods for monitoring and controlling lifespan of procurement processes to minimize procurement fraud of any kind at any step of the procurement process.

BACKGROUND OF THE INVENTION

Tenders are typically held when a tendering entity, such as the government, a city, or others, is looking for a supplier for a specific mandate. Suppliers, also known in this context as bidders, are invited to submit a bidding proposal and other documentation, along with a proposed cost, to the tendering entity within a predetermined deadline. The employees or officers of the tendering entity then review the received proposals and chooses one supplier based on predetermined criteria. Through the need assessment stage to supply/payment; there is a high risk of occupational fraud of procurement type.

Collusion or corruption fraud commonly occurs during the review process. Yet, malpractices may be arranged from need assessment throughout the whole process until the payment/warranty period. As an example, when misleading/incomplete tendering information is published, a reviewer may select a bidder over another for personal or subjective reasons being outside of selection criteria. Typically, non-desired products/services may be supplied to the tendering entity and paid by the said entity even if such products/services are of no use to the entity. Such collusion tends to discourage potential bidders to participate in the tendering process. As the same bidding suppliers are typically contracting with the tendering organization, the competition between bidding suppliers is reduced. Moreover, the same few bidding suppliers may agree to decide which supplier is to be the lower bidder. As a result, fewer competitors and sharing of payments of fraud between the competitors or the employee of the tendering entity tends to lead to higher price for procuring services or products to the tendering entities. Thus, all tendering entities, citizens or even consumers pay to cover the beneficial margin and corruption proceeds.

There is thus a need for an improved method and system for reviewing a tender and to manage procurement processes which would mitigate the shortcomings of the prior art.

SUMMARY OF THE INVENTION

The computer-implemented method for controlling tender review process or procurement process is disclosed herein. The method comprises a server communicating or publishing tendering information on a network, receiving and collecting a tender information by an application server; collecting the bids, randomly selecting at least 3 first-level reviewers from a reviewer register, simultaneously collecting, within a limited a predetermined period of time first-level reviews prepared by the first-level reviewers. The method further comprises selecting second-level reviewers and transmitting the prepared first-level reviews to the second-level reviewer devices. or providing access to the first-level reviews. The method further comprises collecting second-level reviews from the second-level reviewers and transmitting or providing access to the second-level reviews to the third-level reviewers. The method further comprises selecting third-level reviewers. The method further comprises collecting third-level reviews from the third-level reviewers. The third-level reviewer may be the last to conclude. For example, more levels of review may be applied. The collected reviews are then analysed and the winner of the tender is selected based on those reviews. The system for controlling tender review process is also disclosed.

In an aspect of the invention, a computer-implemented method for managing a tender review is provided. The method comprises sending information relating to the tender to a server, the server storing the tender information to a data source, a server publishing the tender information on a network, using a computerized device to send a bid in relation to the tender, the bid comprising at least bidding amount, randomly selecting at least three first-level reviewers from a list of registered reviewers, each first-level reviewer submitting to the server at least one first-level review with regard to at least one of the received bids, randomly selecting at least one second-level reviewer from the list of registered reviewers, the at least one second-level reviewer being different than any of the first-level reviewers, the second-level reviewer submitting to the server at least one second-level review with regard to the bids reviewed by the first-level reviewer, selecting at least one third-level reviewer from the list of registered reviewers, the at least one third-level reviewer being different than any of the first-level and second-level reviewers, the third-level reviewer submitting to the server at least one third-level review with regard to the bid reviewed by the second-level reviewer and selecting a winning bid based on the collected reviews from reviewers.

The method may further give access to the prepared first-level reviews to the selected second-level reviewer. Each of the selected reviewers may have no access to the identity of the other selected reviewers may have a predetermined period of time to submit a review to the server.

The method may further comprise giving access to at least portions of the second-level reviews to the selected third-level reviewer or giving access to at least portions of the first-level reviews to the selected second-level reviewer.

The method may further comprise encrypting the information stored in the data source and any information communicated over the network. The server may encrypt the information stored in the data source.

The method may further comprise communicating the submitted reviews to an approving user or may further comprise the approving user submitting to the server an approbation or submitting objection to at least one of the submitted reviews.

The method may further comprise giving access to the submitted approbation or objections to one or more appeal committee members and selecting members of the appeal committee from the list of reviewers, the selected members of the appeal committee reviewer being different than any of the previously selected reviewers. The method further comprising the members of the appeal committee review being randomly selected from the list of reviewers. The method may further comprise the selected members of the appeal committee submitting an appeal committee review to the server.

The method may further comprise sending an invitation to all bidders having submitted the bids and selecting the winning bid method further comprising the winning having the lowest bidding amount. The method may further comprise each bidding having different sections whereby each section receives a review score submitted by each reviewer for each section of reviewed bids. The method may further calculate a weighted average mark for each bid based on predetermined weights.

The method may further comprise bidding sections comprising at least a technical section and an administrative section, the method further comprising refusing the bid if at least one criteria associated with the administration section does not meet a predetermined value. The method may further comprise giving the same based score to all bids meeting the administrative and technical sections prerequisites, the winning bid having the lowest bidding amount.

The method may further comprise activating a whistleblower tool which may trigger the communication of a notification to security users. The method may further comprise suspending the tender reviewing method until a whistleblowing event is resolved.

The method may further comprises sending a message to a selected reviewer, the message comprising a link to accept or decline the reviewing. The method may further prevent access to the information relating to the bidding to predetermined users.

The method may further comprise a bidding entity submitting a registration to the server. The method may further associate a priority which each received bid and send received bids to reviewers in the order of the associated priority.

In another aspect of the invention, a system for managing a tender review is disclosed. The system comprises a network, a data source, a server, a plurality of reviewer computerized devices and a plurality of bidding entity computerized devices.

The data source may be configured to store information about a tender process, the information comprising information about the tendering entity, object of the tender process and conditions of the tender process. The data source may also be configured to store bidding entities, bids submitted by the bidding entities and reviewers.

The system whereby the server comprises a central processing unit and transient memory, the central processing unit being configured to execute a computer program configured to receive information relating to the tender from one of the computerized devices, store the received tender information to the data source, publish the stored tender information on the network, receive and store in the data source a bid in relation to the tender from one of the computerized devices, the bid comprising at least bidding amount, receive and store in the data source a bid in relation to the tender from one of the computerized devices, the bid comprising at least bidding amount, randomly fetch from the data source at least three first-level reviewers from the reviewers, receive and store at least one first-level review with regard to at least one of the received bids from each computerized device of the first-level reviewer, randomly fetch from the data source at least one second-level reviewer from the list of registered reviewers, the at least one second-level reviewer being different than any of the selected first-level reviewers, receive and store at least one third-level review with regard to at least one of the received bids from the computerized device of the second-level reviewer, randomly fetch from the data source at least one third-level reviewer from the reviewers, the at least one third-level reviewer being different than any of the first-level and second-level reviewers, receive and store at least one third-level review with regard to the bid reviewed by the second-level reviewer from the computerized device of the third-level reviewer and select a winning bid based on the stored reviews from the selected reviewers.

The system further comprises the plurality of reviewer computerized devices being adapted to connect to the server through the network, each reviewer computerized device being configured to communicate to the server at least one review with regard to at least one of the received bids.

The plurality of bidding entity computerized devices are adapted to connect to the server through the network, the bidding entity computerized device being configured to communicate to the server a bid in relation to the tender from one of the computerized devices and the bid comprising at least bidding amount.

The system may further comprise the data source being further configured to store pre-qualifier bidding entities. The system may further comprise encrypting the data source and the data source being further configured to store appeal committee members relating to a tender process. The program may being further be configured to fetch reviewers from the data source and to associate the reviewers as an appeal committee member and the selected members of the appeal committee reviewer being different than any of the previously selected reviewers.

The system may further comprise the program being configured to allow access to at least portions of a stored second-level review to the third-level reviewer computerized device. The system may further comprise the program being configured to allow access to at least portions of a stored first-level review to the second-level reviewer computerized device.

The system may further comprise approving user computerized device, the program being configured to communicate the submitted reviews to the approving user computerized device.

The system may further comprise the server being configured as a web server adapted to serve user interfaces to the computerized devices.

The system may further comprise the user interfaces comprising an information section, an administrative section, a technical section and a financial section.

The system may further comprise the network being the Internet.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which:

FIG. 3 is an example of a user interface of an administrative section of the system for controlling a tender review process of FIG. 2.

FIGS. 4a and 4b show examples of user interfaces of required element of a tender in accordance with the principles of the present invention.

FIG. 5 shows an example of a user interface allowing a bidder to propose price or financial information for each required element of the tender using the system for controlling a tender review process of FIG. 2.

FIG. 6a shows an example of a user interface of a user signing up process for an account in the system for controlling a tender review process of FIG. 2.

FIG. 6b is an example of a user interface of process to log in the system for controlling a tender review process of FIG. 2.

FIG. 6c is an example of a user interface of the information about the bidder entity or individual of the system for controlling a tender review process of FIG. 2.

FIG. 7 is an example of a user interface allowing a reviewer to enter information relative to bidding of a bidder being reviewed.

DETAILED DESCRIPTION OF THE PREFERRED EMBODIMENT

A novel system and method for reviewing, monitoring and controlling tenders will be described hereinafter. Although the invention is described in terms of specific illustrative embodiments, it is to be understood that the embodiments described herein are by way of example only and that the scope of the invention is not intended to be limited thereby.

The method 100 and system 200 for controlling tenders as described herein may help to reduce, prevent and eventually eliminate procurement fraud during the tender process by managing at least three or more levels of reviews and randomly selecting pre-set reviewers from a pool of reviewers. The reviewers in the pool of reviewers may be internal and/or external to the tendering entity. In typical embodiments, the reviewer analyze the established budget and the technical specifications associated with the tender. Indeed, fraud may start from this stage. Each stage of the procurement process may be reviewed as any detail may be used to quickly and correctly identify a fraud or suspicious activities.

It should be understood that the term level and stage when referred to the review process is used herein interchangeably and relates to the level/stage/round of the review process. Therefore, the "first-level" and "first-stage" should be understood to mean the same; "second-level" and "second-stage" should be understood to mean the same, etc. It should also be noted that the present method and system may be apply to tendering review process or the complete procurement process.

It should further be understood that a method where reviewers have access to the content of the previous level review is generally known as a vertical analysis and a method where reviewers do not have access to the content of the previous level review is generally known as an horizontal analysis. More specifically, horizontal may mean that reviewer of the same level/stage will not be able to see the content of a review of another reviewer of the same level/ stage but reviewer from a higher and/or lower lever may be able to access the content of the review.

Figure 1:
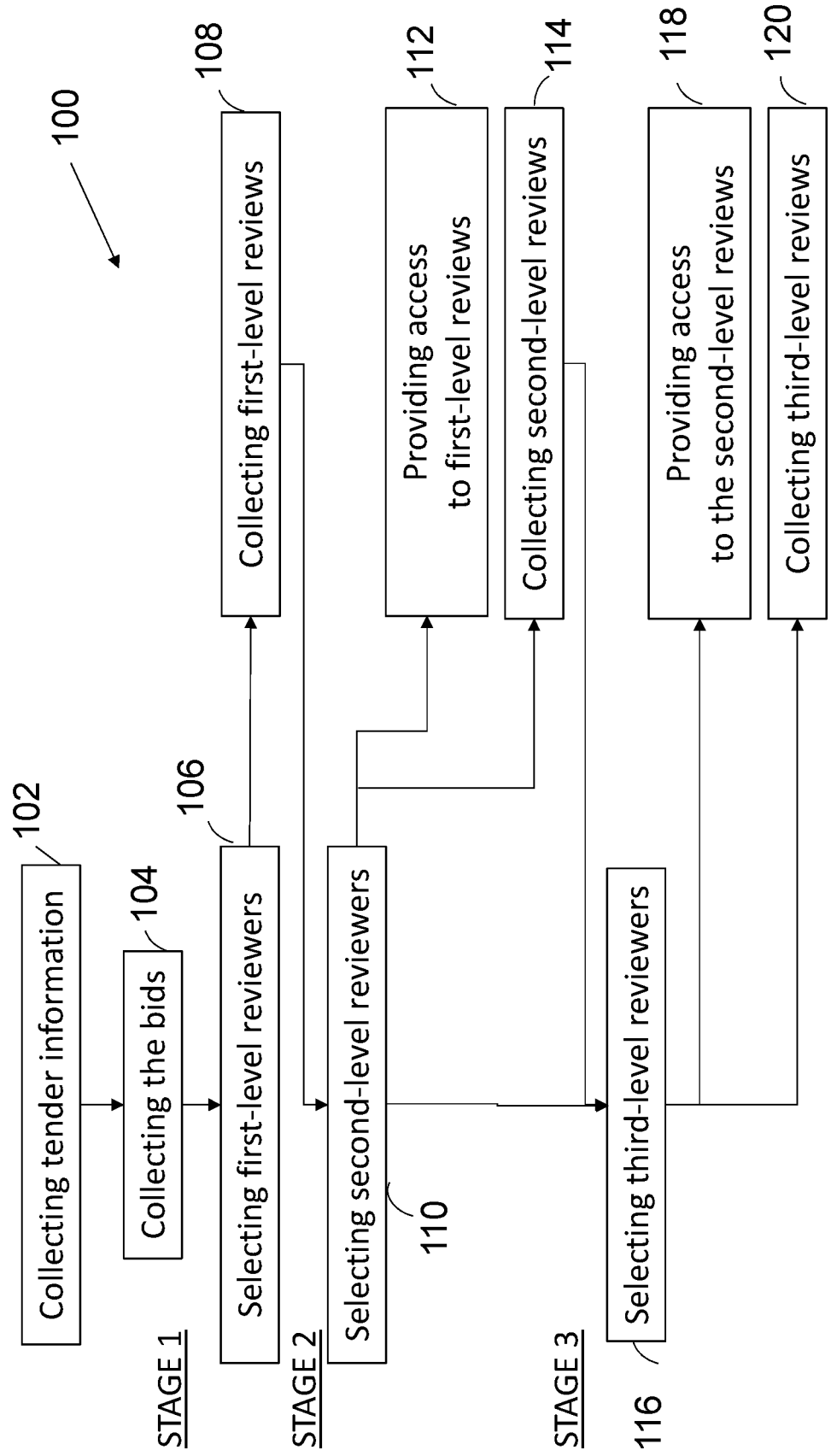
FIG. 1 is a flow chart diagram of an example method for controlling a tender review process, in accordance with the principles of the present invention.

Referring now to FIG. 1, an embodiment of a method of monitoring and controlling tender review process 100 is shown. In such an exemplary embodiment, the method 100 is shown with three levels of reviews.

Typically, the method 100 comprises a step of displaying and/or publishing a tender 102. The method 100 further comprises bids being submitted 104 with regard to the published tender at step 102. The method further comprises a multi-stages review process. In a preferred embodiment, as shown in FIG. 1, the method 100 comprises at least three stages (levels) of review 106/108, 110/112/114, 116/118/120. At stage or level of review, multiple reviewers are selected to review the bids. The method may further comprise giving access to each reviewer to the information regarding the tender, bids, and previous reviews. In some embodiments, depending if an horizontal or a vertical review is selected, the system is configured to grant access a reviewer to see the other person comments. The method may further control which information to provide to the reviewer. For example, information that may identify the reviewers (and/or bidders) is not accessible to the other reviewers. Understandably, such information may be disclosed in event where a fraud investigation is started. In such a case, the system is configured to send a notification to all users of a fraud investigation.

In some embodiments, the method 100 may further comprise detecting vertical and horizontal uncorrelated data. Such detected vertical and horizontal uncorrelated data may be used for reporting to risk/internal audit department. In such embodiment, the identified data shall be analysed prior to selecting a winner.

Still referring to FIG. 1, in the exemplary embodiment, the method 100 comprises selecting first-level reviewers 106 from a list of reviewers. Each selected reviewer realizes a first-level review of the bid and submits such review in the system 108. The first-level reviewers are provided with access to the tender information and the information provided earlier by the bidders. After the first-level reviewers have submitted the realized reviews, the method 100 further comprises randomly selecting second-level reviewers 110 from a list of reviewers, while making sure that the reviewers that have already participated in review of the current tender are not chosen to review the current tender at any subsequent stage/level of review. The method further comprises providing the selected second-level reviewers with access to the information provided by the bidders and to the first-level reviews 112 submitted by the first-level reviewers at step 108. After the second-level reviews have been collected, the method further comprises randomly selecting third-level reviewers 116 from a list of reviewers. The selected third-level reviewers are provided with access to the information regarding bidders and, in some embodiments, to the submitted second-level reviews 120. In another embodiment, the method may further comprise providing access to the selected third-level reviewers to the submitted first-level reviews.

In a preferred embodiment, following the last level of analysis, the third-level in the present embodiment, the system may communicate the different reviews information to an approving user, such as a user being part of the management team. The approving user may then either approve or provide objections of the review process. In event of an objection, the management team becomes accountable and owns the objections. Indeed, the provided objection, which may comprise comments, are associated with the tendering process or procurement process. In a preferred embodiment, the final decision shall not be changed by such comments or objections. The system is configured to communicate or add the said objections to the tendering process which will be accessible by the appeal committee users. The appeal process is discussed in more details below.

In some embodiments, a reviewer may or may not have access to the content of the previous level review. Understandably, in some embodiments, a combination of horizontal and vertical analysis may be used, typically known as pyramid method of analysis.

In some embodiment, when the reviews are completed and are communicated to the system, the approving user uses a device to approve the process or disapprove the process. In some embodiments, the approving user may provide comments or other details relating to the disapproval. Such comments are sent to claims officers using means to preserve confidentiality of such information.

The system and method then selects the final winner. In at least one embodiment, the winner may be selected based on the lowest price and reviews collected. For example, the reviewers may assign scores to each bidder for each section as described herein (e.g. administrative section, technical section). At the end of the tendering process, the system may collect the scores assigned to all participating bidders and calculate weighted average marks for each bidder. The system may further combine these marks with prices proposed by the bidders to determine the winner of the tender.

In some embodiments, the method further comprises combining the calculated scores and the budget prices prior to select a winner. As an example, in product tenders, each reviewer will associate a score mark to the technical section. Understandably, the score mark may be any rating such as a mark out of 10 or out of 100. In a preferred embodiment, the bidder shall not be selected if the only one administration requirement is not met.

In some embodiments, the system may be configured to select a winner for specific products or services. In such an embodiment, all bidders presenting a bid which is respect the administrative and technical section prerequisites shall be awarded the same score. To determined the winner, the system will then select the bidder having presented the lowest price.

It should be noted that such system and method generally aim at eliminating human intervention at multiple stages of review process of the tender in order to reduce fraud.

Understandably, any other number of review stages (levels) may be performed. For example, the number of review stages, but at least three, may be chosen by the tender entity when it supplies the advertisement. The tendering entity may also be able to choose the number (one or more) of reviewers for each stage (level) of review.

Figure 2:
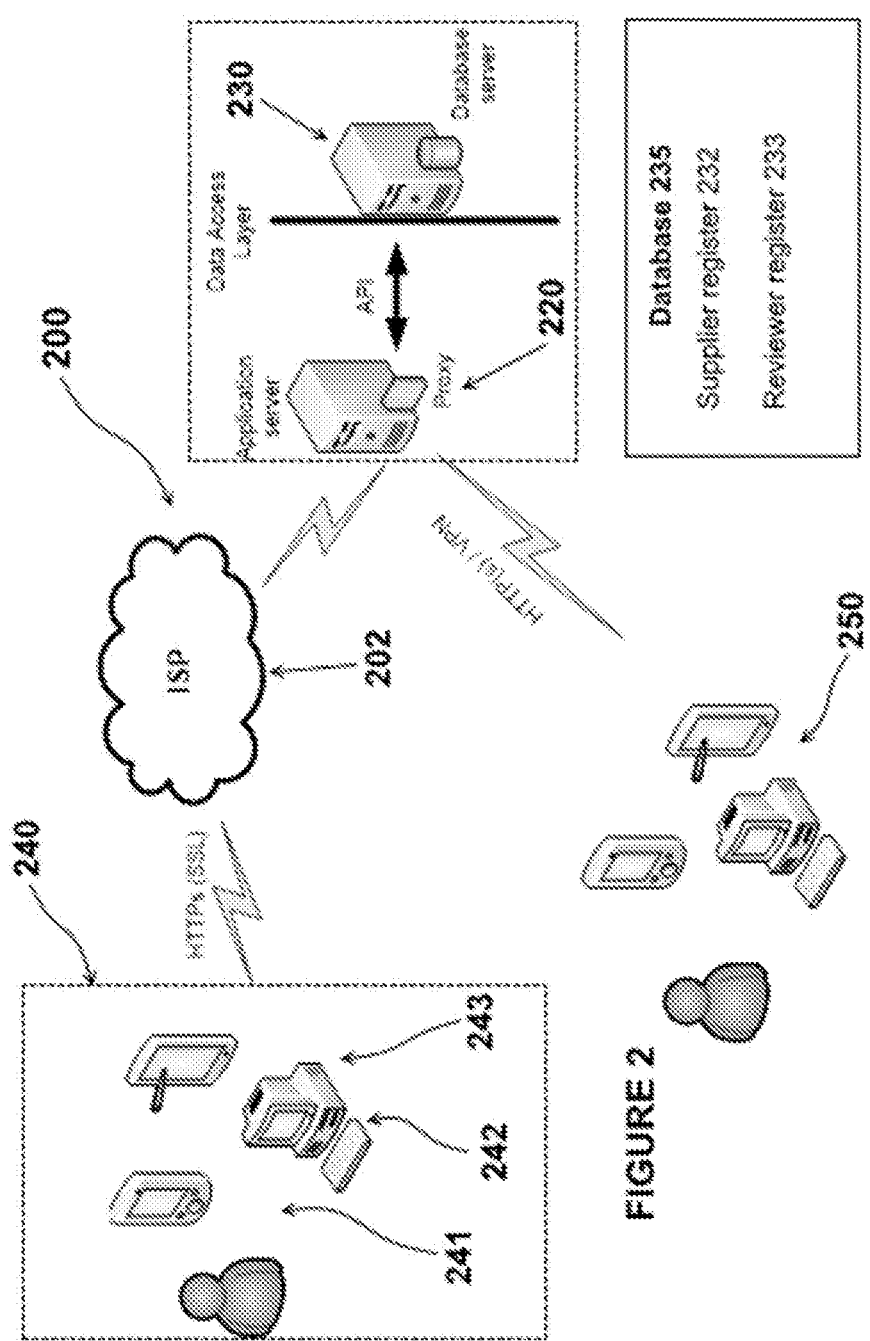
FIG. 2 is a schematic view of a system for controlling a tender review process, in accordance with the principles of the present invention.

The method 100 may be, for example, implemented as a system 200 for controlling tender review process in order to reduce and prevent procurement fraud, such as the system 200 shown in FIG. 2. The system 200 comprises an application server 220, a database server 230, a network 202, and user devices 240 and/or 250.

With the use of the method 100 and the system 200 described herein, human intervention into the tender process may be limited to reviewing information and timely providing comments. The reviewers use computerized devices 240 and/or 250 to submit the reviews to the application server 220 which are then stored in a data source or in the database server 230. However, the tender entity, bidders and reviewers may not modify, at any stage of the tender process, the information that has already been submitted to the database server 230. The system may further comprise a backup module for creating security copies of any save/confirmed information.

The method 100 and the system 200 described herein generally aims at providing an confidential environment to reviewers. As such, in a typical embodiment, each reviewer is unaware of the identity of the other reviewers. A request to review may be communicated only to each reviewer. Such request may be sent using any type of electronic communication method, such as but not limited to emails, SMS, etc.

The system 200 may use any encryption method to ensure confidentiality of the communication between the users and between the users and the application server 220. In some case, the system 200 may deactivate encryption in event where administrative users must analyse any document or review content. When encryption is deactivated, a notification is sent to the reviewers affected by the deactivation. In such case, a user court report unwanted deactivation of encryption. For that purpose; management should communicate to reviewers the reason for the non-encryption of analysts which must be in a legal framework as this could lead to intimidation.

In some embodiment, the method may further comprise or the system may further be configured to allow a user of any type (registered or unregistered) to send out information about any suspicious activities during the tendering process, such as but not limited to pressure during reviewing or elimination or removal of requirements. Such user may be referred as whistle-blowers users.

In other embodiments, the system may be configured to support multiple currencies within the same tendering review. In such an embodiment, the system uses predetermined exchange rates or retrieve the current exchange rate from a third-party system. The system may thus generate reports in any requested currency.

In some embodiments, the method 100 may further comprise a tender entity making a public call (hereafter "tender") for suppliers in one or more categories. For example, the suppliers may be vendors, contractors, or any other type of bidders that may want to be chosen to provide products and/or services to the tender entity.

In some embodiments, the budget value of the procurement or tender process may be display to any user of the system, including public users and bidding users. Typically, the budget value may not be modified after being published.

In other embodiment, the system may be configured to trace any suspicious activity by logging and reporting omissions of an element of the tender offer to be analyzed by a reviewer. In such events, the access to the system by the identified reviewer may be permanently or temporary removed by an administrative user.

In such embodiments, the tender entity gathers information relating to the tender. The gathered information is submitted or inputted in a system allowing the information to be displayed. In a preferred embodiment, a user uses a computerized device 241, such as a computer, a smart phone, a tablet or any other device allowing the submission of information about the tender to the application server 220. The tender information is then published or displayed to a selected audience (public, private, etc). For example, a copy of an advertisement may be requested by the application server 220 from the tender entity device 241 in order to confirm public awareness about the tender (e.g. a copy of the advertisement of the tender may need to be uploaded or a URL may need to be inserted in a specific field). For example, a contract may be attached together with full technical specifications and pictures.

The system 200 is configured to receive and store tender information using, for instance, the application server 220 and/or a database server 230 for storage.

The system 200 may be configured to receive a notice from the tender entity when a tender is displayed. In other embodiments, the system 100 may further detect and retrieve tender information from tender entities. As an example, the website of a tender entity may advertise/display such tender information. The system 100 may detect such new tender and retrieve the information about the tender from the website. The tender notice may comprise, upon other elements, the requested services/products and any documents to be reviews and rated during the tender.

The system 200 may be configured to provide a deadline before which bidders may submit a bid in relation to the tender. In a further embodiment, the tender may be closed for bidding after the said deadline.

In at least one embodiment, the tender notice may further comprise information about the tender field (e.g. information technology, furniture, office supplies, construction, etc.). Alternatively, the system 200 may detect the tender field from the tender notice. For example, the tender entity may upload the advertisement of the tender in an appropriate table. For example, the system 200 may then publish such advertisement of the tender on its platform and/or automatically submit it to suppliers. The system 200 may then prompt the tender entity to upload a proof of advertisement of the tender through other channels. Such measure may help to make sure the tender has been well advertised and is public.

In a typical embodiment, a bidder logs in the system. The bidder selects a tender for which a bid needs to be submitted. The bidder inputs any required information, such as documents, answering questions, etc. If required, the bidder inputs bidding prices in relation to any items required by the tendering entity (see FIG. 5). The system 200 is configured to limit or restrain access to at least portion of the applications in order to allow only editable field to be edited by the bidding user. As an example, the number of submitted bids may be only displayed to the procurement and management team until the tender open time period has expired (deadline has passed), while the information on the prices proposed by the bidders is not revealed to the procurement and management team (for example, management of the system may be managers, internal auditors and investigators).

Referring back to the reviewing method, the review process may comprise a reviewer rating a bid for a tender. As an example, the reviewer may allow a pass or fail note, rate a bid using a number of stars, add a full review including comments, etc.

In at least one embodiment, the method 100 may comprise selecting any reviewers from a list of available reviewers. The selection process may assign any reviewer to any level of review and to the appeal level. In a preferred embodiment, the selection process selects unique reviewers amongst all the review levels. In other words, if a reviewer is selected for a specific review level of one tender review, the same reviewer may not be selected for another revision level for the review of the bidding of the same tender. Each reviewer will be assigned only once to review the same tender. Reviewers will see comments of previous reviewers but not personal identification information of the reviewers (e.g. names and contacts).

Now referring to FIG. 7, an example of the requested information or data to be inputted by a potential reviewer and to be stored in the reviewer register 243 is shown.

In at least one embodiment, the reviewer register 233 generally comprises a structure allowing storing all available reviewers data. The review register typically comprises contact information of each reviewer, such as email, coordinates, etc., and any other technical data (e.g. type of device, IP address, etc.).

For example, the information on potential reviewers in the register 243 may be sent by the system for approval. For example, such request for approval of potential reviewers may be sent to human resources department, procurement, finance and/or top executives. For example, only approved potential reviewers may be further contacted regarding the reviews.

As an example, the application server 220 may be configured to select a predetermined number of reviewers per review level. In another example, the number of reviewers at each level may be set by the tendering entity. In some embodiments, the predetermined number may be stored in the database server 230. In a preferred embodiment, the predetermined number may be 3 or 4 per review level.

In yet other embodiments, each reviewer may be associated with one or more fields of expertise. The application server 220 is then configured to select reviewers from the list of potential reviewers which are in a field of expertise associated with the tender.

Upon randomly selecting the predetermined number of potential reviewers, a notification or review request may be sent to each selected reviewer. Understandably, any type of notification may be used without departing from the principles of the present invention, such as, a letter, an email, a phone call, an SMS or any other type of electronic message or communication protocol. In some embodiments, the selected reviewer may confirm availability for review by any known mean, such as responding to the notification email, clicking on a URL contained in the notification, calling an automated system, etc. As an example, the application server 220 may be configured to send a review request to the reviewer device 243. Upon reception of the request, the selected reviewer confirms or declines the review request by responding to the request or by clicking on a URL.

In some embodiments, the review request may comprise the tender advertisement, the tender field, the tender review duration or period and any other relevant information.

Upon reception of the confirmation to the request from one reviewer (i.e. the reviewer device 243 sends a confirmation back to the application server 220), the application server 220 may be configured to send a further notification to predetermined computerized devices, such as user devices (e.g. notify the procurement team and management). Such notification must not provide any information which could lead to identifying the reviewer. Omitting such information aims at preventing collusion and fraud.

When a selected reviewer has accepted the review request, the system 200 sends a notification to the selected reviewer to start the first stage review process. The notification typically comprises the period for executing the first stage review and the overall duration of the tender review process.

Typically, the selected reviewer would receive a notification comprising a URL or a link to the system 200 which allows displaying of the information in relation to the tender and to the review process.

In a preferred embodiment, the system 200 provides an interface allowing a user (a reviewer) to add comments and an overall verdict, such as, but not limited to, approval or refusal. In some embodiment, the system 200 is configured to add comments with regard to each required elements of the tender. In a preferred embodiment, the graphical user interface displays each required element and an associated input box for commenting and/or adding a verdict at the item level.

The graphical user interface may display all bidders compared on one screen with marks and/or verdicts. The comments of the reviewers may be also displayed at the same screen.

In a preferred embodiment having three levels of review, the reviewers the system 200 is configured for the first two levels to provide comments and verdicts for the received proposals. The system is further configured for a third level reviewer to review the comments of the first two levels reviewers and the proposals to confirm or decline the verdicts. In at least one embodiment, the review of all first-stage reviewers may be done simultaneously. Understandably, in a preferred embodiment, each reviewer shall not be able to identify other reviewers of the biddings submitted in relation with the tender. Indeed, if one reviewer knows the identity of another reviewer, pressure or influence may be put on such reviewer. Thus, in a preferred embodiment, the system may reveal the identity of the reviewer only in events of fraud or investigation in which case access to such information is allowed by law. Each review from each reviewer may be timed and the time spent by each reviewer to review each bidder may be limited. The number of sessions to complete the review (i.e. the number of times the reviewer may work on the same review) may be limited (for example, by the tendering entity). For example, printing and/or "save as" function may be unavailable or disabled to improve confidentiality and reduce fraud. For specialized firms to analyse the tenders, a camera may be connected to the system and may aim at the reviewer. The camera is configured to track any movement occurring during the review process. Again, for administrative section; the system may comprise links to third-party systems or other external system and/or may be configured to validate retrieval of the attachments.

In a preferred embodiment, the application server 220 is configured to provide a user interface for the system. The user interface typically comprises of four components: an administrative section 300 (FIG. 3), a technical section 400a, 400b (FIG. 4), a financial section 500 (FIG. 5) and an information section (FIG. 6).

Referring now to FIG. 3, an example of the administrative section 300 is illustrated. The administrative section 300 presents a list of documents to be reviewed. The administrative section 300 displays a verdict for each document and preferably for each reviewer of the present section. In the present embodiment, the verdict may be pass or fail. A bidder receiving "pass" status for all items of the administrative section is allowed to be reviewed at the next stage of review.

Now referring to FIG. 4, an example of an interface of the technical section 400a and 400b is shown. The technical section comprises all items or services required by the tendering entity and on which a bid must be received. Each item may be associated with a description, a photo or figure and the required number of items. The reviewer has thus access to the said technical sections 400a or 400b and may review the proposed items by the bidder. Based on the type of product (photo, description), the reviewer may be prompted to choose whether each item passes or fails or if the bidder passes or fails. If the bidder has offered an alternative to a specific product or service, the reviewer may be prompted to validate first whether the alternative is acceptable. If the alternative product or service is not acceptable, it fails the review. If the alternative product or service is acceptable, it may be further considered and reviewed as if it was originally requested (by the tendering entity) product or service.

Now referring to FIG. 5, an example of an interface of the financial section 500 is shown. The financial section 500 is typically similar to the technical section 400a or 400b but further comprises the unit price and/or total price proposed by the bidder. The financial section 500 allows a reviewer to rate the said bidder based on the prices and costs submitted in relation with the tender. In some embodiments, the system may automatically analyze the financial section following the review of the other sections by the reviewer. In such embodiments, the system is configured to compare financial values with predetermined ratios, ranges or values in order rank or calculate a mark associated with the financial section. The system is configured to analyze all bids and to select the bids that meet certain predefined criteria. The system may further be configured to combine other sections rates to select the winner.

Understandably, in examples where the items of the tender are services, the items of technical section 400a, 400b may be adapted to be rated independently from the financial section 500.

The system 200 may be configured to determine the selected bidder of the tender based on the weighted marks received for technical section and for financial section.

In at least one embodiment, the system 200 is configured to randomly select at least three first-level reviewers from the reviewer register 233. The system 200 then collects the first-level reviews submitted by the at least three selected first-level reviewers. The system 200 collects these reviews within a predetermined period of time which usually correspond to the period of the tender first-stage review. Understandably, the system 200 may be configured to select any other number of first-level reviewers without departing from the principles of the present invention.

After the first-level review has been conducted, the system selects the second-level reviewers from the reviewer register 233. Again, the system 200 may be configured to randomly select the second-level reviewers.

In a typical embodiment, the application server 220 is configured to send a notification to the reviewer or reviewer devices 243 of the selected second-level reviewers. The notification typically comprises a mean for accepting or declining the participation of the selected reviewer in the review process. The mean for accepting or declining may be a widget in an application, a URL or link in an email or other electronic message or any method to accept or decline. Upon acceptation of the selected second-level reviewer to participate in the review process, the application server 220 add the second-level reviewer to the list of second-level reviewer of the present tender review. If one or more of the selected second-level reviewers declines or does not response to the notification or invite to participate in the review process, the system 200 selects other second-level reviewers from the reviewer register 233 to replace the reviewer having declined the invitation. The notification to the second-level reviewer may further comprise information on the second-level reviewing time period or deadline.

In at least one embodiment, the system 200 may be configured to request the tender entity to input information (e.g. name) about a parent entity (dominating entity, or donor entity). Example of parent entity may be a parent company or a donor organization. In such an embodiment, the system 200 is configured to request a list of potential reviewers from the parent entity (parent register). It should be understood that the list of potential reviewers may comprise more reviewers than the system 200 may need in order to keep the actually selected reviewers anonymous from the tender entity. The system 200 may then randomly select the reviewers from the list of reviewers provided by the parent entity.

In yet another embodiment, the system 200 may add to the list of select reviewers at least one reviewer from the parent entity, at least one reviewer from a consulting agency or both. The system 200 may request a list of potential reviewers from the consulting agency to form a consulting register.

It should be noted that the system may request, at each stage of the review process, reviews from at least three reviewers.

In some embodiments, the system is further configured to display at least some information of the first-level reviews to the second-level reviewers during the second-level review period.

In such embodiment, if the selected second-level reviewer has accepted to participate in the review process, the application server 220 may then provide first-level reviews to the second-level reviewer. The application server 220 may be configured to send notification to open the first-level reviews. Preferably, the notification would comprise one or more link or URL directing to the first-level reviews.

Understandably, the system 200 may comprise an authentication process for any reviewer of any level to gain access to the system. Preferably, a login interface is displayed for a reviewer to gain access to the system 200. An interface of the system 200 may display the first-level reviews and provide a mean for the second-level reviewers to input the second-level reviews. The second-level reviewers are provided with comments made by the first-level reviewers but the second-level reviewers do not have any access to personal identification information of the first-level reviwers (e.g. names and contacts).

In at least one embodiment, the review of all second-stage reviewers may be done simultaneously.

Upon submission of all the second-level reviews by the second-level reviewers, the system 200 completes the second review stage.

In a preferred embodiment, the system 200 launches a third review stage after having completed the second-level review.

During the third-level review, the system 200 is configured to randomly select third-level reviewers from the reviewer register 233. Again, the selected third-level reviewers shall not have been selected from the first and second-level review.

As for the first and second reviews, the system 200 is configured to send a notification or invite to the selected third-level reviewer. In a preferred embodiment, the system 200 sends an electronic message to the devices 243 of the selected third-level reviewers. The invite typically comprises a mean to accept or decline their participation in the review process. The invite is typically associated with period of validity. The invite may also comprise information on the third-level reviewing period.

The acceptation of the third-level reviewer to participate in the review process triggers the sending of a confirmation notification to the system 200. In a preferred embodiment, the application server 220 is configured to receive the confirmation notification from the third-level reviewer device 243. When a selected third-level reviewer declines or does not respond to the invite within a period of validity of the invite, the system 200 randomly selects other third-level reviewers from the reviewer register 233. The system will select a reviewer and send a request to at least one reviewer device to be answered in a certain period of time. For example, timing of the review by reviewers may be recorded and lengthy review (e.g. longer than a pre-determined time period) may cause an alert to be sent automatically to operators of the system 200.

The review at each level may include timing of the review, deadline of the review to be submitted. The review may also be administered in a specific room so that the reviewer may not be influenced.

As for the second-level reviewers, the system 200 may be configured to give access to the second-level reviews by the third-level reviewers.

If the selected third-level reviewer has accepted to participate in the review process, the application server 220 receives the notification from the third-level reviewer and may then provide second-level reviews to the third-level reviewer. For example, the application server 220 may send a link directly to the reviewer device that would open the second-level reviews. The third-level reviewer may then provide third-level reviews (comments) while having access to the previous reviewers' comments.

In at least one embodiment, the review of all third-stage reviewers may be done simultaneously.

After having collected all third-level reviews, the system 200 may then select the fourth-level reviewers from the database 235. It should be understood that any number of review stages, which is more than three, may be implemented using the method described herein.

It should be understood that when the system 200 chooses the reviewers at different stages for one tender, the newly selected reviewers do not include the reviewers already selected in previous level of review for the same tender.

It should also be understood that at each stage of the review the tendering entity (tender entity devices 241) and/or management and procurement team may only receive messages that will have information on the progress without mentioning the names and other information on reviewers to prevent fraud and collusion.

In some embodiments, the system may be configured to generate a report to all bidders and management of the project with relevant information. Before reporting the winner, the system requests at least one management associated with the tender review process to approve or decline the decision resulting from the tendering review. A management user may input comments or reasons for declining, such comments and reasons shall be associated with the management user. If the decision is declined by management user, the system may send a request to the appeal committee review board to review the decision.

The system and method then selects the final winner. In at least one embodiment, the winner may be selected based on the lowest price and reviews collected. For example, the reviewers may assign scores to each bidder for each section as described herein (e.g. administrative section, technical section). At the end of the tendering process, the system may collect the scores assigned to all participating bidders and calculate weighted average marks for each bidder. The system may further combine these marks with prices proposed by the bidders to determine the winner of the tender.

During the tender review process, the system 200 may back-up the information at every stage of review.

The system may be configured to send a notification comprising the final verdict to each bidder. The notification may comprise a mean for the bidders to input supplier feedback such as, e.g., comments and/or petitions (also may be called "claims") if they are not satisfied with the review process. The mean to provide input may be associated with a period of validity.

In a preferred embodiment, the application server 220 is configured to send to the supplier devices 242 the said notifications which typically comprise a link to an interface to provide feedback. Upon receiving the feedback, the system 200 may transmit the comments and/or petitions to a predetermined claims committee. Members of the claims committee may be randomly selected from the reviewer register 233 by the application server 220 or may be predetermined by the tender entity. It should be understood that the members of the claims committee are the reviewers from the reviewer register 233 that did not participate in the revision of the particular tender the claims committee is reviewing. In at least one embodiment, the system 200 may further select members of the second appeal committee which may provide final decision.

If management user at least refuses the first claim committee report and the second claim committee report, the system may be configured to send an invitation request to all bidders. Such invitation generally aims at reducing the influence on the meeting. The system may further be configured to display a whistleblower tool adapted to report any suspected malpractice associated with a tender. In a preferred embodiment, a button is display on the device of any user. Upon activating the whistleblower tool, the system is configured to send a notification to a predetermined third-party system or to predetermined users, such as the security department. Such notification may act as a trigger to initiate an internal audit. If the whistleblowing is not resolved within a predetermined duration the system suspends the approval process. The use of whistleblowing tool shall be logged to provide evidence of any intention to cheat. Such logs may be used for prosecution.

The system 200 may be configured to send scheduled notifications to the selected bidders. In a preferred embodiment, the notifications are scheduled to be sent to the supplier devices 242 during the tender open time period. As an example, the notifications may be scheduled to be sent to the supplier devices 242 one day before the closure of the tender. The system may send reminder notifications to approved pre-qualified suppliers if the tendering entity chooses to use a pre-qualified pool of suppliers (for example, the suppliers that have been earlier pre-approved by/for this tendering entity).

In some embodiments, the system 200 may be configured to provide a minimum number of pre-qualified suppliers. In a preferred embodiment, the number of pre-qualified suppliers shall be 30-50 to limit the chances of bid rigging. If the minimum number of pre-qualified suppliers is present in the system, each supplier must be qualified in order to participate in the bidding process.

Upon reception of the said notification from the bidder, no modifications of the report may be permitted by the reviewer.

After the final tender winner has been selected, the system 200 may send a tender report having information on the tender to all other bidders, the tender report may comprise the identity of the selected bidder.

In at least one embodiment, after the winner has been selected and has supplied the object of the tender, and within a pre-determined time period, the system 200 may send a request to the winner of the tender and/or the tendering entity of the corresponding tender with a request to upload photos and/or technical specifications of the delivered product and/or services. For example, uploading a performance report filled in by the tendering entity (and/or by the winner of the tender) may be requested by the system 200.

The system 200 may be configured to manage the complete procurement process. In such a system 200, the system 200 may be configured to provide inter-dependent stages, such as budget stage throughout analysis, delivery, payment and warranty stages. In a preferred embodiment, the steps are ordered and a preceding step must be completed prior to activate or enable the next step. As an example, 30% of the contract is executed by the bidding winner, the system shall be configured to limit that amount of the invoicing to 30% of the reviewed finance section. In another example, if the contract relates to products, if only 25% of the number of products to be received comprises in the tender, only 25% of the number of product will be activated for reception. In some embodiments, the system may be configured to track the final destination of procured items.

For example, a claiming report with information on the feedback received from the bidders may then be issued. Such information may be sent to the bidders.

Referring again to FIG. 2, the system 200 configured to control and/or review the tendering process is illustrated. The system 200 preferably comprises a program adapted to execute instructions stored on a computer-readable medium. The program, when executed on a processor or on a computerized device, performs the steps as described herein. Furthermore, a computer-implemented method for controlling tender review process comprising executing on a processor steps as described above is also disclosed.

The application server 220, user devices 240 and the reviewer devices 243 may be computer devices (computerized devices) that are programmed to perform the steps as described herein. Each of the application server 220, user devices 240 and the reviewer devices 243 may have a processor, input device (such as a keyboard and a mouse), and output device (such as a monitor).

In a preferred embodiment, the application server 220 is configured to act as a web server adapted to serve user interfaces to the user devices 240 or 250. In such an embodiment, the application server 220 is configured to fetch data from a data source 235, such as a database. The database 235 may be hosted on a server 230 or any other type of computerized device. In preferred embodiment, the data source 235 is configured to store a supplier register 232 (of suppliers that have already been registered) and a reviewer database 233. For example, there may be pre-qualified suppliers in the supplier register 232 for some tendering entities and/or specific products and/or specific services.

The application server 220 is generally configured to receive request from the user devices 240 or 250. Upon reception of the request, the application server 220 is further configured to process the said request and to fetch data based on the processed request. The system 200 may further be configured for the application server 220 The system will be able to provide reporting tools based on the information stored in the data source 235. The system 200 may further be configured to calculate statistical data adapted planning and analyzing tendency by region or other predetermined criteria.

The application server 220 may be configured to be accessible from a public network (such as a WAN or the Internet) or from a local network, such as a LAN. In a preferred embodiment, the data source 135 is not accessible from a public network.

The data source 230 may be any type of database server, such as a relational database (i.e. MySQL™, Oracle™, etc), an object database or any other type structured files (i.e. XML file, JSON object). For both security and scalability reasons, the database 135 may be accessed through a data access layer which exposes REST FULL APIs and the data is exchanged in JSON format.

For example, the database 235 and the application server 220 may be hosted on the same network 202 or on the same physical machine. In another example, the system 200 may be designed in such a way that the application server 220 and the database server 230 may be hosted in different networks and not necessarily in the same geographical locations.

The communication channels and protocols of the network depend on both the ISP and the client's network architecture as well as where or how the application and database servers 220, 230 are hosted. For example, the system 200 may use HTTP and/or VPN protocols.

Separating the database server 230 from the application server 220 may advantageously provide room for efficient scalability of the system and to add security by not exposing the system's database to the public (Internet). For example, whenever the database 235 is modified, this system 200 provides flexibility of only changing the data access layer without affecting the application layer.

The user devices 240 of the system 200 may be public user devices 244 and the internal user devices 250. The public user devices 244 may include tender entity devices 241, supplier devices 242 and reviewer devices 243. The public user devices 244 may access the application server 220 through the Internet as shown at FIG. 2. The internal user devices 250 may access the application server 220 without going through the Internet. For example, the internal user devices 250 may communicate with the application server 220 using the http and/or VPN protocols.

For example, the user devices 240 may be in the same premises or same private network as the application server 220. The other part may include the users accessing the system through the virtual private network (VPN).

For example, the user device 240 may be any computing device that may provide input/output and communicate with the application server 220. For example, any one of the user devices 240 may be a smartphone, a laptop and/or personal computer. The user device 140 may have a processor, a display, and a keyboard.

Referring again to FIG. 2, in at least one embodiment, the database server 230 may have a supplier register 232. For example, such supplier register 232 may contain a list of suppliers, earlier registered with the system 200. For each supplier, the supplier register 232 may include the following information: supplier's name, field of tenders the supplier would want to participate in, and at least one supplier device 242 to which notification of the tender should be sent. It should be understood that any other information relevant to the tender and/or supplier may be included in the supplier register.

The system 200 may send a request from the application server 220 to the database server 230 to obtain a list of registered suppliers wishing to participate in a tender related to the field of the tender. The system 200 may then send at least one tender notification to the at least one supplier device 242 registered in the system 200.

For example, the system 200 may also display the tender publication or advertisement on the system's web-site. The system may be further configured to log or store information about the publication or advertisement of the tender, such as the date of publication. The system may further be configured to automatically send notification to predetermined list of users when a tender is published by the system.

The system 200 is configured to allow a client device 242 of a supplier to enter bid information through interfaces or through a program executed on the client device 242. The application server 220 is configured to receive the bid information and to store the information in the data source 235. The application server 220 is further configured to display or communication information about the tendering to the client devices 240 or 250.

For example, bidder users, such as registered suppliers wishing to participate in the tender offering, may sign in and get access to the tender information such as administrative section 200 and/or technical section 400a, 400b, shown at FIGS. 3, 4a and 4b. Such information may allow bidders to assess whether the said bidders qualify to the tendering. An example of an administrative section 300 of the tender is shown at FIG. 3.

The tendering entity may classify and show tenders in classes in order to be able to assign reviewers with specific skills. For example, each class may be related to one or more tender fields.

For example, if the tender is in a particular technical field, the reviewers will have to possess the related technical skills. Otherwise, the tender field may be set as "general" which will require no special skills.

For example, a proof of publication of the advertisement of the tender as described above may be a compulsory requirement for final submission and/or tender publication by procurement of the tender.

In a preferred embodiment, the bidder may have to input various information in order to be accepted in the tender review process. An example of a list of administrative documents required from the bidder to participate in the tender, is shown at FIG. 3. The information to be uploaded to the system 200 may comprise company registration certificate, company audit report for last 3 years, guaranty of application, proof of financial abilities, at least one curriculum vitae of key personnel, and any other relevant information. The system 200 may further request particular format of the documents. The application server 220 is configured to store the inputted information in the data source 235 at least until the end of the tendering is offered and at least before the review process starts.

In a preferred embodiment, the data stored in the data source 235 is backed-up periodically at least to be used for investigation purposes. The system will have an intelligence system within itself that will report suspicious acts, figures and alter the risk, internal audit or fraud departments.

In some embodiments, the system may comprise querying modules and all analysts and overseers will be able to see the messages. Again, there will be chatting platform for each tender when there is a suspicion for overseers and risk managers comments. Any person can be a whistle-blower and these will be reported for analysis/investigation before final award is confirmed.

Shown at FIGS. 6a, 6b, and 6c are examples of the system output displayed in the information section. For example, the bidder may register if the bidder participates in the tender for the first time (see FIG. 6a). The bidder may then be requested to supply names, contacts and others required information such as business registration, location, and experience, interested fields, etc. The system and the method as described herein may provide an option of transmitting information regarding open tenders to suppliers registered with the system as having particular experience and/or interest fields, etc. The system may also send information based on matching of the "tender field" of the open tenders to suppliers specified the particular "tender field".

For example, the bidder may have been registered earlier with the system 200 and simply access the system 200 using a password in order to participate in the tender (FIG. 4b). The bidder information form (e.g., as shows at FIG. 4c) may be pre-filled or the bidder (e.g. if the bidder is new) may be requested to fill it in.

Shown at FIG. 3 is an example of the system output displayed in the administrative section 300. The bidder may be requested to upload required documents for each tender as specified in the advertisement. For example, the bidder may be requested to upload a copy of business license, audit report for a certain period, guaranties, curriculum vitae of personnel, etc.

FIGS. 4a and 4b show examples of the system output displayed in the technical section 400a and 400b. For example, the tender may include different items that the tender entity may like to obtain from the bidders.

For example, the tender entity may provide photos of some items. For example, the tender entity may allow alternatives for some items in the item list and may restrict alternatives of the other items (e.g., laptop and printer as shown at FIGS. 4a, 4b, and 4c). For example, the other items may be chosen providing the bidders with an option to choose an alternative.

The bidder may also have to upload proposed bidder technical specification. Such bidder technical specification may be useful, for example, if there may be a possibility of proposing alternative items (services and/or products).

For technical or service bids, the bidder may have to fill forms and/or upload some documents for the review process.

In the pricing section, the system 200 may request the bidder to enter the pricing information. With regard to the pricing section in a preferred embodiment, no user has access to such data, the system 200 being configured to automatically synchronize all the valuation marks and to calculate the values meeting predetermined criteria. As an example, prices may automatically be ranked automatically and weighted average rates may be calculated to determine the winner.

The system may report all row data to management team and overseers of the tendering process after each or a certain number of reviews are received or the tender assignment is received. For example, the data may be protected with a password that can be system-generated password. For example, such back-up of raw data may be useful if/when the system collapses, e.g. for alternative actions.

In some embodiments, the system may further be configured to prevent access or control the access to the system. In yet other embodiments, the system may be configured to log the number of times a user is identified by the whistleblowing tool. As an example, if a user is identified more than a predetermined number of times, the system is configured to permanently block or to prevent access to the system of such user.

The system may be further configured to provide an interface for a user to certify a review. As an example, the interface may comprise an input box where the user must type a term, sentences or series of words to agree or confirm the reviewing process. Such term, sentence or word may be dictated by applicable local laws and regulations.

The system may further be configured to allow bids to be analyzed in the order of their submission or according to a priority basis defined by the system.

The system may further be configured to request pre-qualified suppliers to supply at least some of the shareholders, directors, administrators, managers and/or board members information. Such information may be used by the system to trace or identify potential bid rigging. Understandably, the number and the types of person to be identify may vary depending on the area, state or country and may be specified by an entity.

The system may be further configured to make all bidding information and queries available to all bidders to ensure transparency.

The system may be further configured to fetch data from the data source and to correlated or analyze such date using artificial intelligence tools. As examples, such tools may be configured to identify price differences or any complaints from management, audit department or bidders. Such tools may further trigger an appeal committee to review complaints.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A computer-implemented method for minimizing procurement fraud in a tender review performed by a predetermined number of registered reviewers, the method comprising:
 a server receiving over a data network information relating to the tender;
 the server storing the tender information in a data source, the data source comprising identification information of registered reviewers, the number of registered reviewers stored in the data source being greater than the predetermined number of registered reviewers to maintain an anonymity to the registered reviewers from the tender entity;
 the server publishing the tender information on the data network;
 each of a plurality of computerized devices in data communication with the server over the data network sending to the server a bid in relation to the tender, the bid comprising at least a bidding amount;
 the server randomly selecting the predetermined number of registered reviewers from the data source, the random selection comprising:
  randomly selecting in the data source at least three first-level reviewers from the registered reviewers of the data source;
  randomly selecting at least one second-level reviewer from the registered reviewers of the data source the at least one selected second-level reviewer being different than any of the selected first-level reviewers;
  randomly selecting at least one third-level reviewer from the registered reviewers of the data source, the at least one selected third-level reviewer being different than any of the selected first-level and second-level reviewers;
 the server fetching from the data source one of the unreviewed bids in relation to the tender;
 the server generating a link providing an encrypted access to review the fetched bid and sending the link to a device of each of the selected first-level reviewers over the network;
 each of the devices of the selected first-level reviewers sending to the server over the data network at least one first-level review with regard to the selected bid;

giving an encrypted access to the bid to a device of the selected second-level reviewer;

the device of the selected second-level reviewer sending to the server over the data network at least one second-level review with regard to the selected bid reviewed by the first-level reviewer;

giving an encrypted access to the bid to a device of the selected third-level reviewer;

the device of the selected third-level reviewer sending to the server over the data network at least one third-level review with regard to the selected bid reviewed by the second-level reviewer through an encrypted channel;

the server encrypting and storing the received first-level, second level and third level reviews in the data source;

the server selecting a winning bid based on the stored and encrypted reviews from first-level, second-level and third-level reviewers.

2. The computer-implemented method of claim 1, the method further giving access to the prepared first-level reviews to the selected second-level reviewer.

3. The computer-implemented method of claim 1, any user having no access to the identity of the reviewers.

4. The computer-implemented method of claim 3, the method further comprising encrypting the first-level reviews, the second-level reviews and the third-level reviews to ensure no access to the said reviews to any user.

5. The computer-implemented method of claim 1, the method further comprising restricting any access to the reviews of a reviewer for the other reviewers.

6. The computer-implemented method of claim 1, the method further comprising communicating the submitted reviews to an approving user and the approving user submitting to the server an approval or objection to at least one of the submitted reviews.

7. The computer-implemented method of claim 6, the method further comprising:
giving access to the submitted approval or objections to one or more appeal committee members; and
randomly selecting members of the appeal committee from the list of reviewers, the selected members of the appeal committee review being different than any of the previously selected first-level, second-level and third-level reviewers.

8. The computer-implemented method of claim 1, each bid in relation to the tender further comprising different sections, the method further comprising each of the first-level, second-level and third-level reviewers submitting a score for each section of the selected bid and calculating a weighted average mark of the scores based on predetermined weights.

9. The computer-implemented method of claim 8, the sections comprising at least a technical section and an administrative section, the method further comprising refusing the bid if at least one criterion associated with the administration section does not meet a predetermined value.

10. The computer-implemented method of claim 1, the method further comprising activating a whistleblower tool.

11. The computer-implemented method of claim 10, the activation of the whistleblower tool triggering the communication of a notification to security users.

12. The computer-implemented method of claim 10, the method further comprising suspending the tender reviewing method until a whistleblowing event is resolved.

13. The computer-implemented method of claim 1, the method further sending a message to a selected reviewer, the message comprising a link to accept or decline the reviewing.

14. The computer-implemented method of any of claim 1, the method further comprising preventing access to the information relating to the bid being reviewed to unauthorized users.

15. The computer-implemented method of claim 1, the method further associating a priority which each received bid and selecting the unreviewed bids to the reviewers in order of the associated priority.

16. A system for minimizing procurement fraud in a tender review performed by a predetermined number of registered reviewers, the system comprising:
a data network;
a data source, the data source being configured to store:
information about a tender process, the information comprising:
information about the tendering entity;
object of the tender process;
conditions of the tender process;
bidding entities;
bids in relation to the tender submitted by a plurality of computerized devices of bidding entities, the bids comprising at least a bidding amount;
identification information of registered reviewers, the number of registered reviewers being greater than the predetermined number of registered reviewers to maintain an anonymity to the registered reviewers from the tender entity;
a server, the server comprising a central processing unit and transient memory, the central processing unit being configured to execute a computer program configured to:
receive over the data network information relating to the tender from computerized device associated with the tendering entity;
store the received tender information to the data source;
publish the stored tender information on the data network;
communicate over the data network with the plurality of computerized devices of the bidding entities to receive and store in the data source the bids;
randomly select the predetermined number of registered reviewers from the data source, the random selection comprising:
randomly selecting at least three first-level reviewers from the registered reviewers stored in the data source;
randomly selecting at least one second-level reviewer from the registered reviewers of the data source, the at least one selected second-level reviewer being different than any of the selected first-level reviewers;
randomly select at least one third-level reviewer from the registered reviewers of the data source, the at least one selected third-level reviewer being different than any of the selected first-level and selected second-level reviewers;
fetch from the data source one of the unreviewed bids in relation to the tender;
generate a link providing an encrypted access to review the fetched bid and send the link to a device of each of the selected first-level reviewers over the data network;
give an encrypted access to the fetched bid to devices of the selected first-level, second-level and third-level reviewers;
receive over the data network, encrypt and store in the data source at least one first-level, second-level and third level reviews;

select a winning bid based on the stored and encrypted reviews from the first-level, second-level and third level reviewers;

the devices of the first-level, second-level and third level reviewers being configured to communicate with the server through the data network, and configured to send to the server through an encrypted channel at least one first-level, second-level and third level review with regard to at least one of the received bids;

the computerized devices of the bidding entities being adapted to connect to the server through the data network, and being configured to send to the server the bid in relation to the tender.

17. The system of claim 16, the data source being further configured to store pre-qualifier bidding entities.

18. The system of claim 16, the program being further configured to restrict any access to a stored review by any reviewer computerized device other than the computerized device of the reviewer having prepared the said stored review.

19. The system of claim 16, the system further comprising an approving user computerized device, the program being further configured to communicate the received reviews to the approving user computerized device.

20. The system of claim 16, the data source being further configured to store identification information of appeal committee members relating to a tender process, the program being further configured to select one or more appeal reviewers from the data source and to assign each of the selected appeal reviewers as an appeal committee member, the selected appeal reviewers being different than any of the previously selected reviewers.

\* \* \* \* \*